United States Patent [19]
Wass et al.

[11] Patent Number: 5,197,671
[45] Date of Patent: Mar. 30, 1993

[54] PRESSURE RELIEF VALVE WITH THERMAL TRIGGER AND MOVABLE SEAL PLUG

[76] Inventors: Lloyd G. Wass, 1670 Blackhawk Cove, Eagan, Minn. 55122; Michael R. Baird, 8310 Cypress La., Eden Prairie, Minn. 55347

[21] Appl. No.: 811,461

[22] Filed: Dec. 19, 1991

Related U.S. Application Data

[63] Continuation-in-part of Ser. No. 707,596, May 30, 1991, Pat. No. 5,161,738.

[51] Int. Cl.$^5$ ............................................. G05D 27/00
[52] U.S. Cl. ................................... 236/92 C; 137/72; 251/63.5
[58] Field of Search .................... 137/72; 220/89.4; 251/63, 63.5, 340, 343; 236/92 C

[56] References Cited

U.S. PATENT DOCUMENTS

| | | |
|---|---|---|
| 3,263,929 | 8/1966 | Seablow .................. 251/63 X |
| 3,618,627 | 11/1971 | Wagner .................. 137/72 X |
| 3,791,450 | 2/1974 | Poitras .................... 137/72 X |
| 3,842,853 | 10/1974 | Kelly et al. ............. 137/72 X |
| 4,221,231 | 9/1980 | Harvey et al. ............ 137/72 |
| 4,352,365 | 10/1982 | Boccardo et al. ...... 220/89.4 X |
| 4,403,627 | 9/1983 | Bradley .................. 251/63 X |
| 4,922,944 | 5/1980 | Mueller et al. ........... 137/72 |

Primary Examiner—William E. Tapolcai
Attorney, Agent, or Firm—Kinney & Lange

[57] ABSTRACT

A thermally activated pressure relief valve includes a valve housing with an inlet communicating with an interior of a pressure vessel, and a passage from the inlet, through the housing, to an outlet for communicating with the exterior of the housing. A seal plug is disposed within a cavity of the housing and across the passage for sealing the passage. A thermal trigger engages the seal plug within the cavity to restrict movement of the seal plug and maintain a seal of the passage when a temperature adjacent to the housing is below a predetermined temperature threshold. The thermal trigger releases the seal plug, which is movable within the cavity, allowing the seal plug to relocate within the cavity when the temperature reaches the predetermined temperature threshold, thereby exposing a flow path between the inlet and outlet through which gas can escape.

27 Claims, 6 Drawing Sheets

PRESSURE RELIEF VALVE WITH THERMAL TRIGGER AND MOVABLE SEAL PLUG

REFERENCE TO CO-PENDING APPLICATION

This application is a continuation-in-part of application Ser. No. 07/707,596, filed May 30, 1991, entitled PRESSURE AND TEMPERATURE RELIEF VALVE WITH THERMAL TRIGGER by Lloyd G. Wass, now U.S. Pat. No. 5,161,738.

BACKGROUND OF THE INVENTION

The present invention relates to a relief valve. More particularly, the present invention relates to a thermally activated relief valve for use with a compressed gas storage cylinder (or pressure vessel).

In high pressure compressed natural gas systems, it is a requirement to provide a means by which the pressure vessel can be relieved of its gas charge in the event of an excessively high external temperature (e.g., a fire near the vessel). The standard approach has been to incorporate a fusible plug into the design of the system (pressure vessel, valve) that is continuously exposed to the direct pressure of the gas charge. A fusible plug is a fitting that contains a slug of eutectic material that blocks and seals an outlet passage while the external temperature is below a predetermined yield point. When the temperature of the fusible plug reaches the yield temperature, the fusible material melts to provide a pathway for the pressurized gas to escape.

In principle, this approach to temperature relief is acceptable. A problem arises, however, when the fusible plug is exposed to the continuous high pressures of the gas charge at temperatures approaching the yield point of the eutectic material. In such condition, extrusion of the fusible slug may occur, thus producing a potential leak path.

A number of varying strategies can be applied to correct this problem through modification of the fusible plug (e.g., reducing bore diameter, increasing the yield temperature of the eutectic material). None of the strategies mentioned have thus far completely eliminated the problem.

SUMMARY OF THE INVENTION

The present invention is a thermally activated pressure relief valve which includes a valve housing with an inlet for communicating with an interior of a pressure vessel, and a passage from the inlet, through the valve housing, to an outlet for communicating with the exterior of the valve housing. A generally cylindrical-shaped seal plug is disposed within a cavity of the housing and across the passage between the inlet and the outlet, with a flat surface at a first end of the seal plug for sealing the passage. A radial shoulder frames the passage to provide a sealing surface against which the flat surface of the seal plug contacts to create a seal. A beveled annular exterior surface at a second end of the seal plug contacts a thermal trigger.

The thermal trigger incorporates a trigger ball into a channel at a first end of the thermal trigger. The trigger ball, which extends partially beyond the first end of the thermal trigger, is fixed by a small amount of soft metal eutectic within the channel. The trigger ball contacts the beveled annular surface of the seal plug and fixes the seal plug such that the flat surface rests against the radial shoulder to seal the passage when the temperature near the valve housing is below a predetermined temperature threshold. When the thermal trigger reaches a predetermined temperature threshold, however, the eutectic melts and the trigger ball migrates within the channel of the thermal trigger to allow the seal plug to move from a first position to a second position. When the seal plug is in the second position, a flow path through the passage is exposed, allowing fluid pressure to escape to the exterior of the valve housing. Because the eutectic within the thermal trigger does not directly contact fluid pressure, the present invention avoids eutectic creep problems which cause premature pressure leaks.

DETAILED DESCRIPTION OF THE PREFERRED EMBODIMENTS

Figure 1:
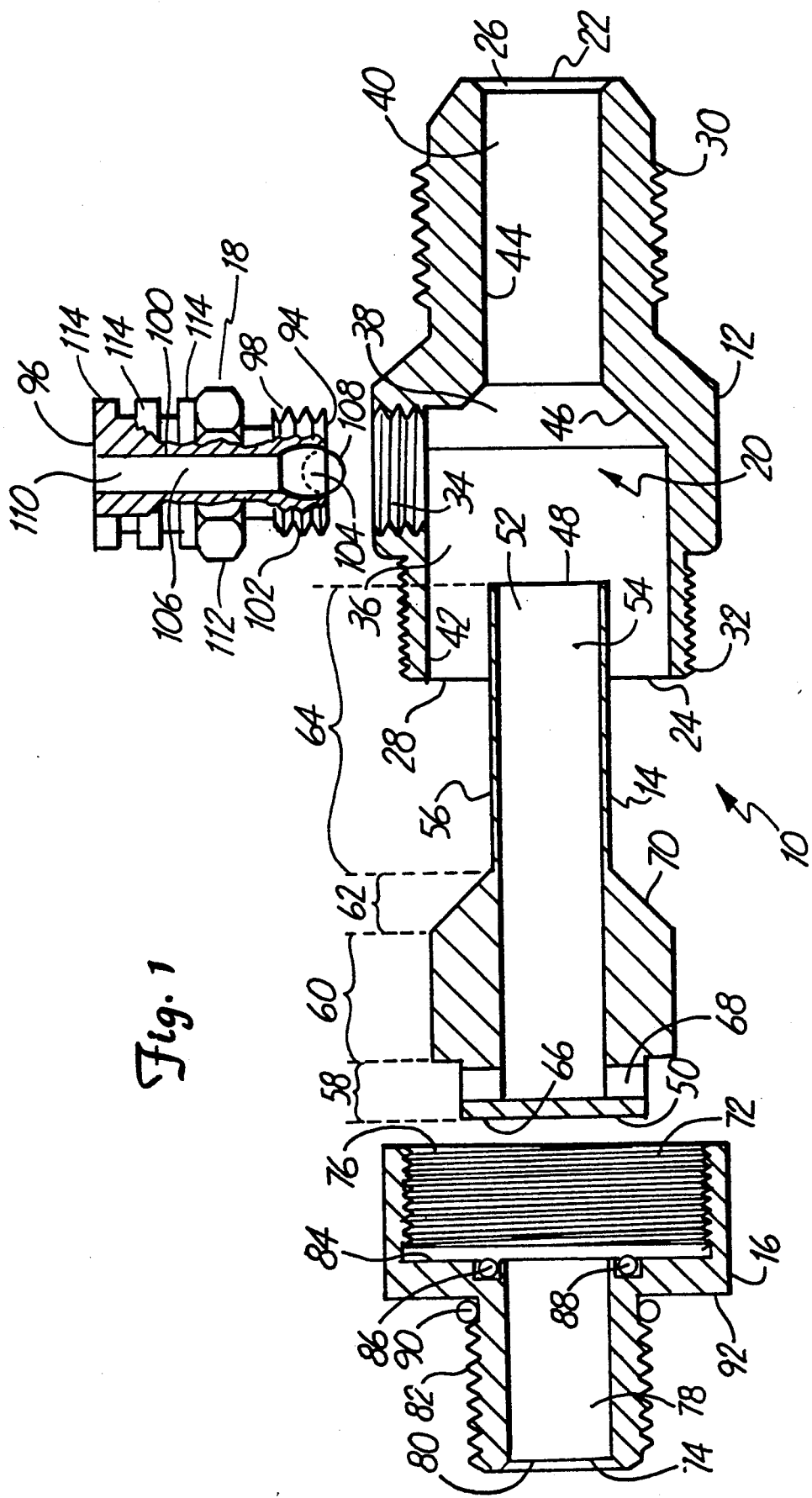
FIG. 1 is an exploded longitudinal sectional view of a first embodiment of the thermally activated relief valve of the present invention.

FIG. 1 is an exploded longitudinal sectional view of a thermally activated relief valve 10 of the present invention. Relief valve 10 includes valve housing 12, seal plug 14, torque fitting 16, and thermal trigger 18. Valve housing 12 includes cavity 20, first end 22 and second end 24. First end 22 defines the outer end of valve 10, and has outlet 26 which exposes cavity 20 to the exterior of housing 12. Second end 24 has opening 28 through which seal plug 14 is inserted to position seal plug 14 within cavity 20.

Housing 12 also includes coarse threaded exterior surface 30, which is near first end 22, and fine threaded exterior surface 32, which is located near second end 24. Coarse threaded exterior surface 30 is provided to accept a threaded cap or fitting (not shown) to cover first end 22. Fine threaded exterior surface 32 is provided to accept torque fitting 16. Valve housing 12 also includes threaded opening 34, which is generally perpendicular to and communicates with cavity 20. Threaded opening 34 is provided to accept thermal trigger 18.

Cavity 20 includes first cavity region 36, second cavity region 38 and third cavity region 40. First cavity region 36 has cylindrical inner surface 42, which has a diameter greater than cylindrical inner surface 44 of third cavity region 40. Second cavity region 38 has a radially tapered surface 46 which tapers from inner surface 42 to inner surface 44.

Seal plug 14 is an elongated, cylindrical-shaped plug which has first end 48 and second end 50. First end 48 has opening 52, which exposes uniform-diameter tubular passage 54. Outer surface 56 of seal plug 14 varies in diameter along the length of seal plug 14 to form first section 58, second section 60, third section 62, and fourth section 64. Section 58 is located at second end 50 and has a diameter smaller that the diameter of section 60. Section 58 includes seal plug surface 66 and exhaust port 68, adjacent to seal plug surface 66 and communicating with passage 54. In one embodiment, seal plug 14 includes two or more exhaust ports 68 equally spaced around the circumference of section 58.

Section 60 is adjacent to section 58 and has a diameter which is slightly larger than section 58. Section 62 is adjacent to section 60 and has a diameter which diminishes from section 60 to section 64, thereby forming tapered shoulder 70. Section 64 is adjacent to section 62 and has a diameter approximately equal to the smallest diameter of section 62. Generally, seal plug 14 is contoured so as to closely fit within cavity 20 of housing 12.

Torque fitting 16 is configured to enclose seal plug 14 within housing 12 and to attach valve 10 to a pressure cylinder. Torque fitting 16 includes first end 72 and second end 74. First end 72 is provided with threaded opening 76, which communicates with vent passage 78 and inlet 80 at second end 74. Second end 74 defines the inner (inlet) end of valve 10. Torque fitting 16 also has threaded exterior surface 82 for threading valve 10 into a threaded opening in a pressure vessel (shown in FIG. 2).

Threaded opening 76 has a diameter greater than vent passage 78, which creates shoulder 84 at the junction of vent passage 78 and threaded opening 76. Annular notch 86 is concentric with shoulder 84 and has an outer diameter less than the diameter of threaded opening 76 to provide a position for O-ring 88. O-ring 88 and shoulder 84 abut seal plug surface 66 of seal plug 14 so as to block vent passage 78 and provide a fluid-tight seal. O-ring 90 is positioned adjacent to mounting surface 92 to provide a fluid-tight seal when valve 10 is mounted to a pressure vessel.

Thermal trigger 18 has first end 94 and second end 96. First end 94 is provided with threaded exterior 98 which is sized to permit threading of thermal trigger 18 into threaded opening 34 of valve housing 12. Thermal trigger 18 has channel 100 extending generally along its longitudinal axis from first end 94 to second end 96. Shoulder 102 divides the channel generally into first channel 104 and second channel 106.

Thermal trigger 18 is also provided with trigger ball 108 which is sized to permit insertion into first channel 104. Trigger ball 108 is large enough, however, so that it abuts shoulder 102 and cannot pass into second channel 106. Channel 104 is swaged at first end 94 to engage a diameter of trigger ball 108 and retain a greater portion of trigger ball 108 within channel 104 while allowing another lesser portion to extend beyond first end 94. In the assembled state of thermal trigger 18, eutectic substance 110 fills channels 104 and 106 and holds trigger ball 108 in a fixed position within channel 104 and partially extending beyond first end 94 of thermal trigger 18.

Thermal trigger 18 includes hexagonal exterior surface 112 to accommodate an appropriate size wrench during installation of thermal trigger 18 into housing 12. Thermal trigger 18 also includes concentric ribs 114 for rapid heat absorption and communication to eutectic substance 110 in channels 104 and 106.

Figure 2:
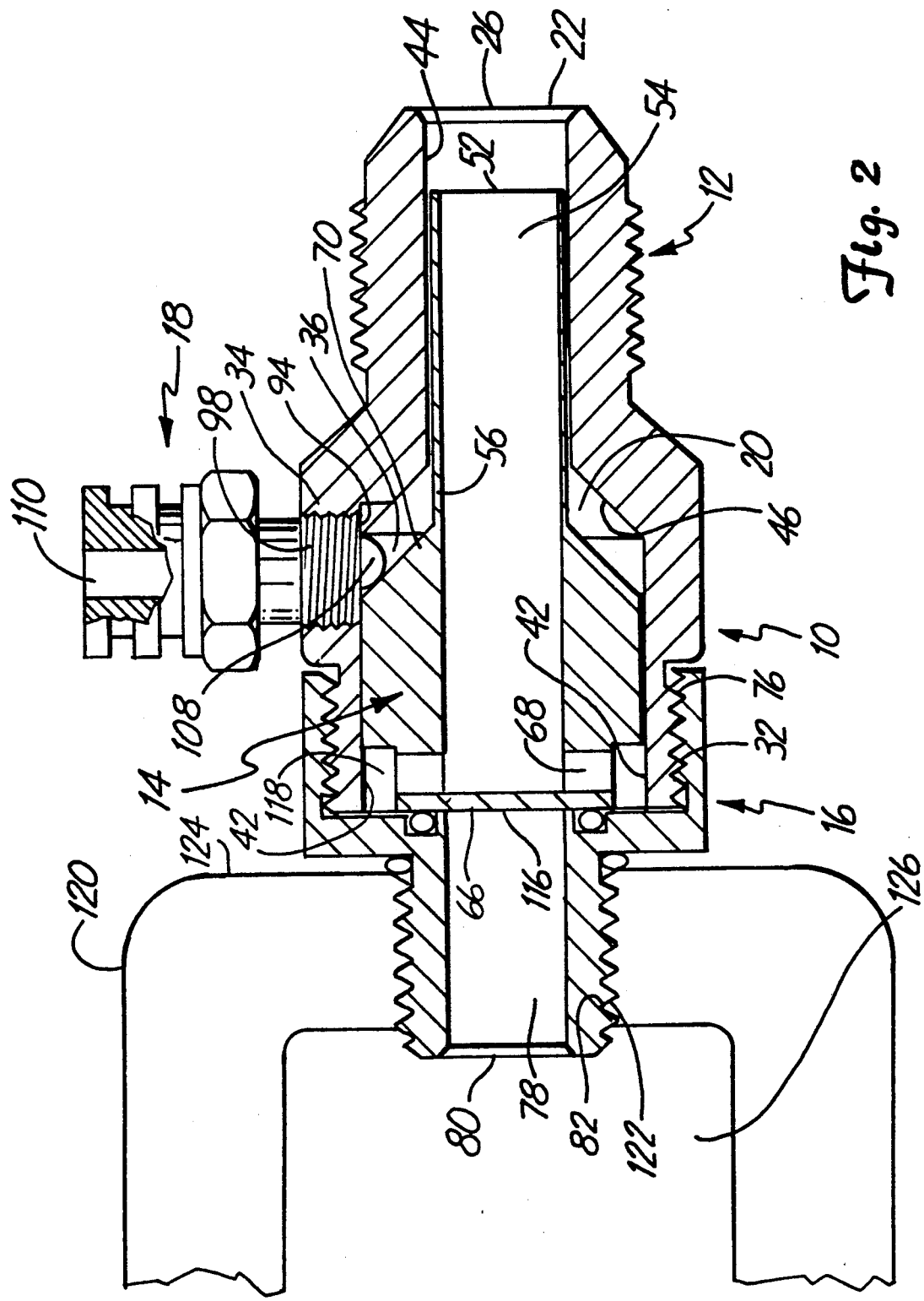
FIG. 2 is a longitudinal sectional view of the relief valve of FIG. 1 shown assembled and mounted to a pressure vessel.

FIG. 2 is a longitudinal sectional view of the pressure relief valve of FIG. 1 shown assembled and mounted to a pressure vessel. Thermal trigger 18 is shown mounted to valve housing 12 with threaded exterior 98 engaging threaded opening 34 of valve housing 12. First end 94 of thermal trigger 18 is generally aligned with cylindrical inner surface 42 of first cavity region 36. Trigger ball 108, which is partially extending beyond first end 94 of thermal trigger 18, lies within first cavity region 36 of housing 12.

Seal plug 14 lies within cavity 20 of valve housing 12. Outer surface 56 of sections 60 and 64 of seal plug 14 are configured to fit closely within, and permit movement within, cylindrical inner surfaces 42 and 44, respectively, of cavity 20. Seal plug 14 is positioned within cavity 20 such that tapered shoulder 70 rests against trigger ball 108. In this "loaded" position, tapered shoulder 70 and first end 48 of seal plug 14 are spaced apart from tapered inner surface 46 and first end 22 of housing 12, respectively, so as to permit seal plug 14 to move outward should trigger ball 108 relocate within channel 104 due to temperatures exceeding a predetermined temperature threshold.

Torque fitting 16 is connected to valve housing 12 by engaging threaded opening 76 over fine threaded exterior surface 32 of valve housing 12. A rotational force is applied in a first direction to torque fitting 16 to fully seat seal plug surface 66 against shoulder 84 and O-ring 88, thereby forming seal 116 and creating vent space 118 between cylindrical inner surface 42 and outer surface 56 of section 58 of seal plug 14. Seal 116 is a fluid-tight seal which separates vent passage 78 from vent space 118. Vent space 118 communicates with exhaust port 68.

Relief valve 10 is connected to pressure vessel 120 by engaging threaded exterior surface 82 of torque fitting 16 within threaded opening 122 of pressure vessel 120. A rotational force is applied to torque fitting 16 in a second direction to seat mounting surface 92 and O-ring 90 against outer surface 124 of pressure vessel 120. In this assembled state, inlet 80 of torque fitting 16 is exposed to interior 126 of pressure vessel 120.

Figure 3:
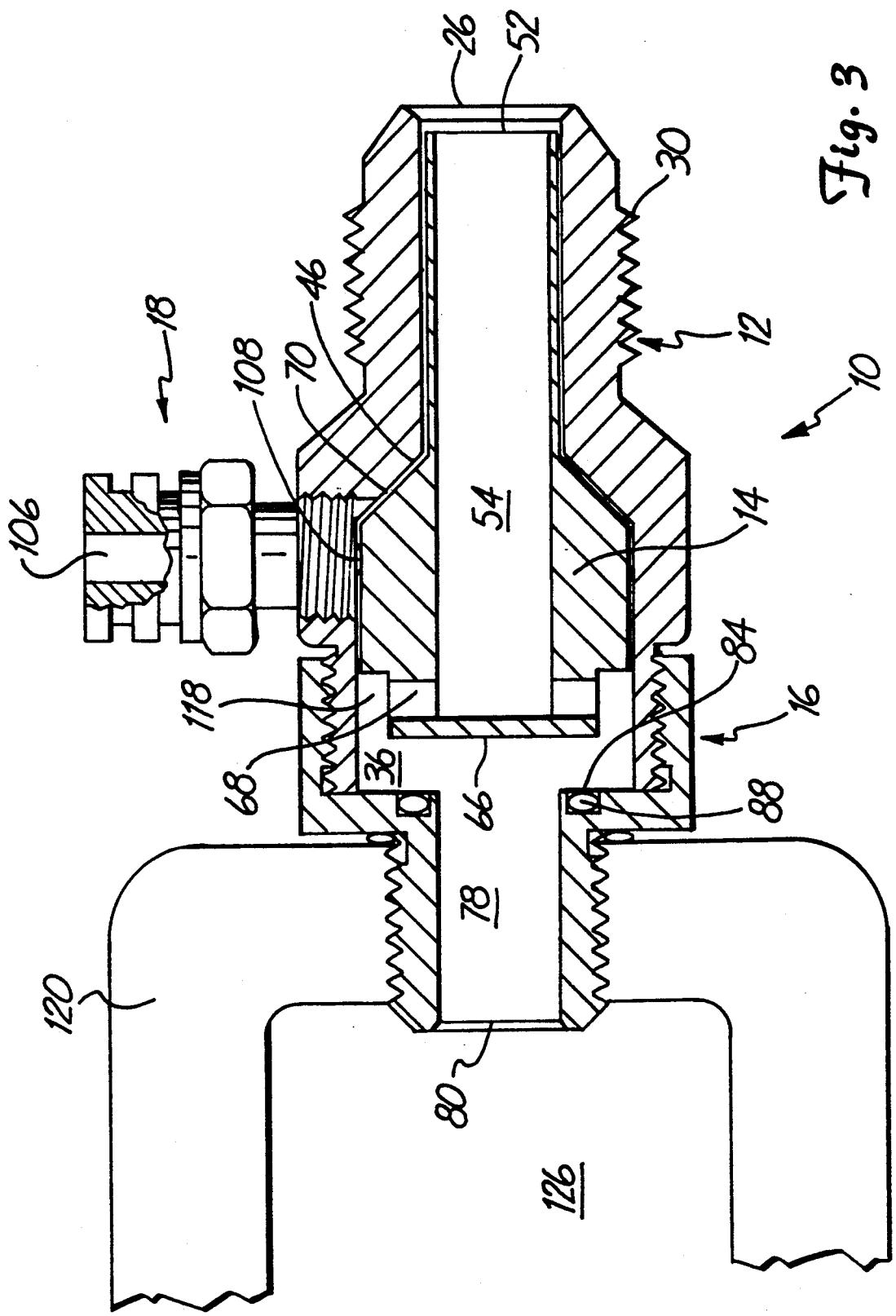
FIG. 3 is a longitudinal view of the relief valve of FIG. 2 in the thermally triggered position.

FIG. 3 is a longitudinal sectional view of the relief valve of FIG. 2 shown in the thermally triggered position. When thermal trigger 16 is exposed to temperatures that exceed a predetermined temperature threshold, eutectic substance 110 of channel 100 melts, thereby liberating trigger ball 108 from its fixed, semi-extended position within cavity 20 of housing 12. As eutectic substance 110 melts and trigger ball 108 becomes liberated within first chamber 104 of thermal trigger 18, gas pressure from interior 126 of pressure vessel 120 exerts an outward force on seal plug surface 66 of seal plug 14; this outward force causes seal plug surface 66 to move outward, away from shoulder 84, which coincidentally causes an outward force to be exerted against trigger ball 108 by tapered shoulder 70. Accordingly, trigger ball 108 relocates to a position primarily within chamber 104, against shoulder 102. In this position, it should be noted is that trigger ball 108 acts as a check valve. In other words, since trigger ball 108 is too large to pass into second channel 106, it rests against shoulder 102 to prevent any gas communication between the passage through valve 10 and the second end 96 of thermal trigger 18.

Seal plug 14 continues to move outward until tapered shoulder 70 contacts tapered inner surface 46. In this position, with seal plug surface 66 disengaged from shoulder 84 and O-ring 88, vent passage 78 is exposed to first cavity region 36, thereby allowing gas to escape through vent space 118, exhaust port 68, passage 54 and outlet 26 of valve housing 12. The flow of gas out of relief valve 10 can be halted by engaging a threaded seal cap (not shown) over coarse threaded exterior surface 30 to seal outlet 26 of valve housing 12. Alternatively, the escaping gas can be recaptured by engaging a threaded fitting, which is connected to a second vessel, over coarse threaded exterior surface 30.

Figure 4:
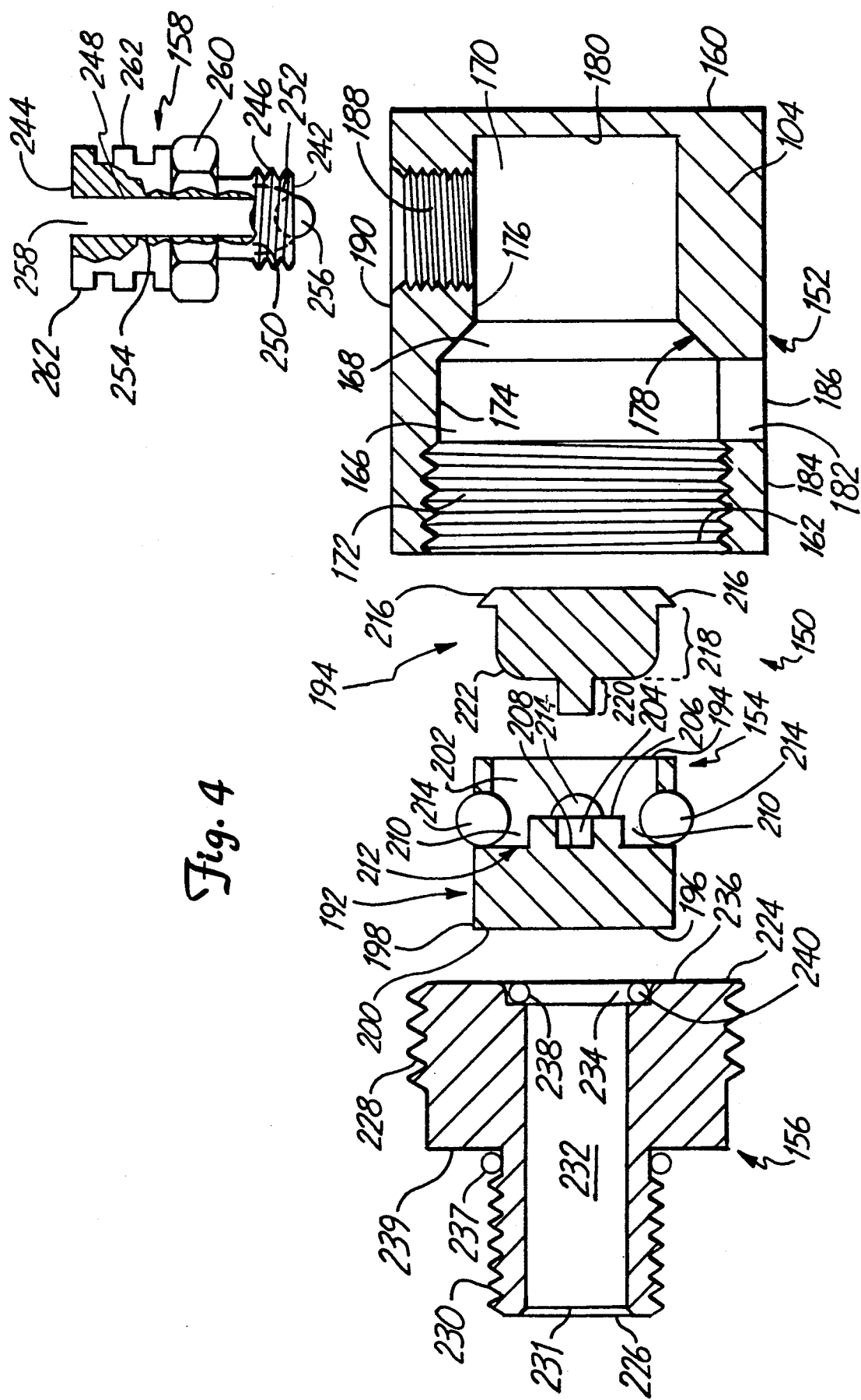
FIG. 4 is an exploded longitudinal sectional view of a second embodiment of the thermally activated relief valve of the present invention.

FIG. 4 is an exploded longitudinal sectional view of a second embodiment of the thermally activated relief valve of the present invention. As shown in FIG. 4, relief valve 150 includes valve housing 152, blocking poppet assembly 154, torque plug 156 and thermal trigger 158.

Valve housing 152, which is fashioned from a solid block of stainless steel, includes first end 160, second end 162 and cavity 164. Cavity 164 is generally cylindrical and is created by boring into the block from second end 162 to create first cavity region 166, second cavity region 168 and third cavity region 170. First cavity region 166 is near second end 162 and includes threaded opening 172. First cavity region 166 has inner surface 174, which has a diameter greater than the diameter of inner surface 176 of third cavity region 170. Second cavity region 168 has a radially tapered surface 178 which tapers from inner surface 174 to inner surface 176. Cavity 164 terminates at end surface 180 of third cavity region 170.

Exhaust passage 182 exposes first cavity region 166 to first side 184. Exhaust passage 182 is perpendicular to cavity 164 and includes outlet 186 through which gas pressure can escape.

Valve housing 152 also includes threaded opening 188, which is generally perpendicular to and communicates with cavity 164. Threaded opening 188 is exposed at second side 190, which is opposite first side 184, and is provided to accept thermal trigger 158.

Blocking poppet assembly 154 includes blocking poppet 192 and restraining member 194. Blocking poppet 192 is formed from a solid cylindrical piece of (metal) having first end 194, second end 196 and cylindrical surface 198. Second end 196 of blocking poppet 192 includes blocking surface 200. First end 194 is bored to provide first bore region 202 and second bore region 204. First bore region ends at first base 206. Second bore region 204, which is concentric with first bore region 202, ends at second base 208.

A multiplicity of holes 210 are bored into cylindrical surface 198, with sides 212 of holes 210 generally aligned with second base 208. Holes 210 have four locations, radially spaced 90° apart, around the circumference of cylindrical surface 198. Holes 210 are perpendicular to and communicate with first bore region 202. Each hole 210 is provided with ball 214, which is moveable within hole 210.

Restraining member 194 is configured to fit within first and second cavity regions 202 and 204. Restraining member 194 includes bevelled edge 216, main body region 218 and pin 220. Main body region 218 is provided with rounded edge 222. In an alternative embodiment, rounded edge 222 is replaced by a radially tapered surface. When retaining member is inserted within first and second boring regions 202 and 204, main body 218 lies within first bore region 202 and pin 220 lies within second bore region 204. When pin 220 is fully seated against second base 208 of second bore region 204, rounded edge 222 contacts balls 214 and exerts an outward force on balls 214, thereby causing balls 214 to extend beyond cylindrical surface 198.

Torque plug 156 is configured to enclose blocking poppet assembly 154 within valve housing 152 and to attach relief valve 150 to a pressure vessel. Torque plug 156 includes first end 224 and second end 226. First end 224 is provided with threaded exterior surface 228 for threading torque plug 156 within threaded opening 172 of valve housing 152. Second end 226 is provided with threaded exterior surface 230 for threading relief valve 150 into a threaded opening in a pressure vessel (shown in FIG. 5). Second end 224 has inlet 231, which exposes cylindrical passage 232 to the interior of a pressure vessel (shown in FIG. 5). Passage 232 is exposed at first end 224 and is framed by annular notch 234 and annular shoulder 236. Annular notch 234 is concentric with passage 232 and has a diameter slightly larger than passage 232, which provides surface 238 against which O-ring 240 rests. Shoulder 236 has a diameter greater than annular notch 234 and is concentric with annular notch 234. Annular shoulder 236 provides a flat metal surface against which blocking surface 200 of blocking poppet 192 is sealed when the temperature near housing 152 is below the predetermined temperature threshold. O-ring 240 also contacts blocking surface 200 to provide an impermeable seal across passage 232. O-ring 237 is positioned adjacent to mounting surface 239 to provide a fluid-tight seal when valve 150 is mounted to a pressure vessel.

Thermal trigger 158 is similar to thermal trigger 18 as shown in FIGS. 1-3. Thermal trigger 158 includes first end 242 and second end 244. First end 242 is provided with threaded exterior surface 246, which is sized to permit threading of thermal trigger 158 into threaded opening 188 of valve housing 152. Thermal trigger 158 has channel 248 extending generally along its longitudinal axis from first end 242 to second end 244. Shoulder 250 divides channel 248 generally into first channel 252 and second channel 254.

Thermal trigger 158 is also provided with trigger ball 256 which is sized to permit insertion into first channel 252. Trigger ball 256 is large enough, however, so that it abuts shoulder 250 and cannot pass into second channel 254. First channel 252 is swaged at first end 242 to engage a diameter of trigger ball 256 and retain a greater portion of trigger ball 256 within channel 252, while allowing another lesser portion to extend beyond first end 242. In the assembled state of thermal trigger 158, eutectic substance 258 fills channels 252 and 254, and holds trigger ball 256 in a fixed position within channel 252 and partially extending beyond first end 242 of thermal trigger 158.

Like thermal trigger 18 shown in FIGS. 1-3, thermal trigger 158 includes hexagonal exterior surface 260 to accommodate an appropriate size wrench during installation of thermal trigger 158 into valve housing 152. Thermal trigger 158 also includes concentric ribs 262 for rapid heat absorption and communication to eutectic substance 258 in channels 252 and 254.

Figure 5:
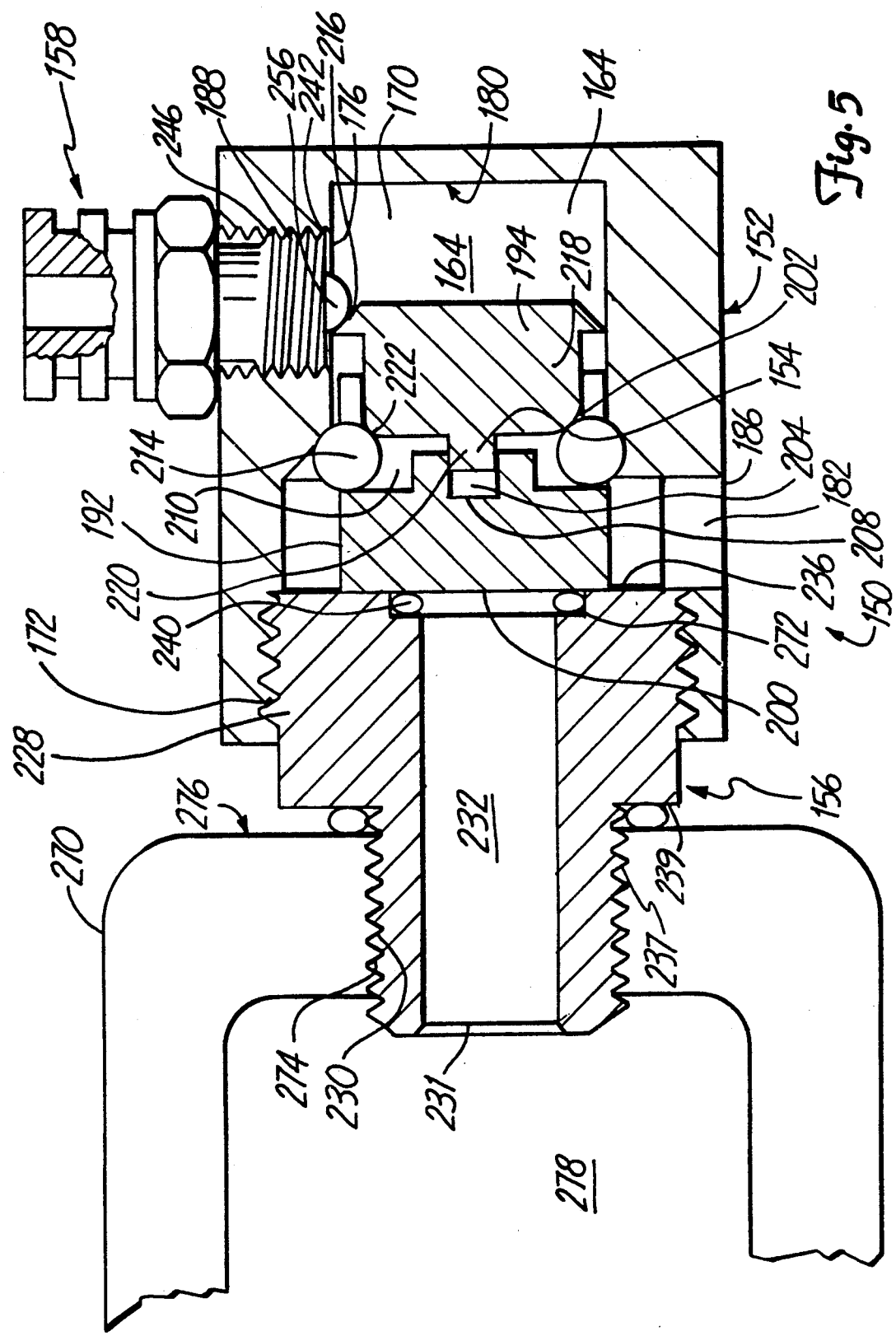
FIG. 5 is a longitudinal sectional view of the relief valve of FIG. 4 shown assembled and mounted to a pressure vessel.

FIG. 5 is a longitudinal sectional view of the relief valve of FIG. 4 shown assembled and mounted to pressure vessel 270. Thermal trigger 158 is shown mounted to valve housing 152, with threaded exterior 246 engaging threaded opening 188 of valve housing 152. First end 242 of thermal trigger 158 is generally aligned with inner surface 176 of third cavity region 170. Trigger ball 256, which is partially extended beyond first end 242 of thermal trigger 158, lies within third cavity region 170 of valve housing 152.

Blocking poppet assembly 154 lies within cavity 164 of valve housing 152. Restraining member 194 is positioned within cavity 164 such that beveled edge 216 rests against trigger ball 256 when pin 220 and main body region 218 are seated within first bore region 202 and second bore region 204, respectfully, with pin 220 contacting second base 208 of second bore region 204. In this "loaded" position, rounded edge 222 contacts balls 214 and exerts an outward force on balls 214 which causes balls 214 to extend beyond cylindrical surface 198 and engage radially tapered surface 178 of second cavity region 168. With balls 214 engaging tapered surface 178, blocking poppet 192 is restricted from moving within cavity 164 toward end surface 180. Ample space exists between beveled edge 216 of restraining member 194 and end surface 180 of third cavity region 170 so as to permit blocking poppet assembly 154 to move toward end surface 180 should trigger ball 256 relocate within channel 252 due to temperatures exceeding a predetermined temperature threshold.

Torque plug 156 is connected to valve housing 152 by engaging threaded exterior surface 228 within threaded opening 172 of valve housing 152. A rotational force is applied in a first direction to torque plug 156 to full seat blocking surface 200 against annular shoulder 236 and O-ring 240, thereby forming seal 272. Seal 272 is a fluid tight seal which separates passage 232 from cavity 164 of valve housing 152.

Relief valve 150 is connected to pressure vessel 270 by engaging threaded exterior surface 230 of torque plug 156 within threaded opening 274 of pressure vessel 270. A rotational force is applied to torque plug 156 in a second direction to seat mounting surface 239 and O-ring 237 against outer surface 276 of pressure vessel 270. In this assembled state, inlet 231 of torque plug 156 is exposed to interior 278 of pressure vessel 270.

Figure 6:
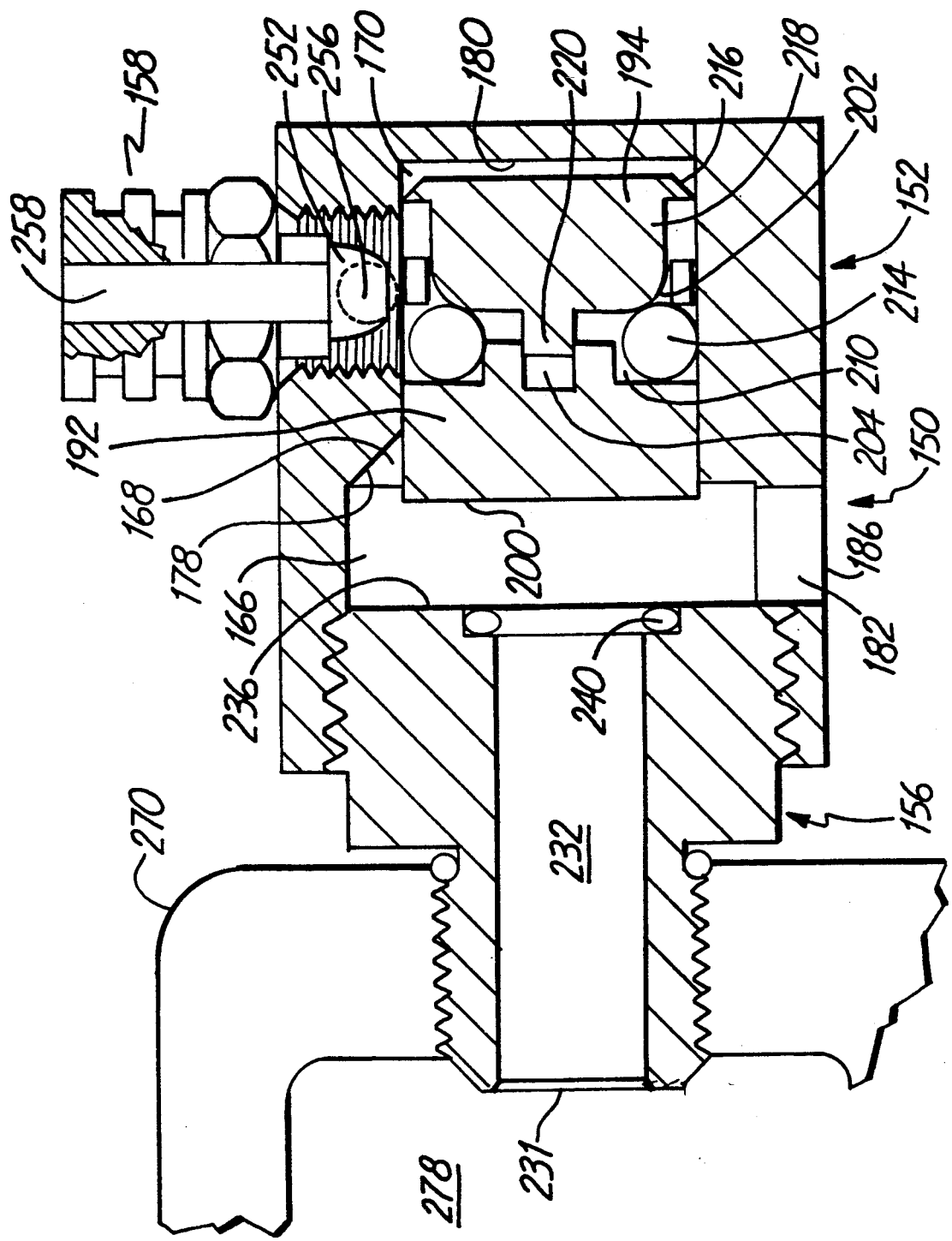
FIG. 6 is a longitudinal sectional view of the relief valve of FIG. 5 in the thermally triggered position.

FIG. 6 is a longitudinal sectional view of the relief valve of FIG. 5 shown in the thermally triggered position. When thermal trigger 158 is exposed to temperatures that exceed a predetermined temperature threshold, eutectic substance 258 of channel 248 melts, thereby liberating trigger ball 256 from its fixed, semi-extended position within cavity 164 of valve housing 152. As eutectic substance 258 melts and trigger ball 256 becomes liberated within first chamber 252 of thermal trigger 158, restraining member 194 moves toward end surface 180 of third cavity region 170. As restraining member 194 moves towards end surface 180, pin 220 withdraws from second bore region 204, and rounded edge 222 moves away from balls 214, thereby allowing balls 214 to disengage from tapered surface 178 of second cavity region 168 and retreat within holes 210 of blocking poppet 192. With balls 214 disengaged from tapered surface 178, gas pressure from interior 278 of pressure vessel 270 exerts an outward force on blocking surface 200 of blocking poppet 192, which moves blocking poppet 192 towards third cavity region 170. As blocking poppet 192 moves towards third cavity region 170, seal 272 is broken, thereby exposing passage 232 to first cavity region 166. With first cavity region 166 exposed to passage 232, a right angle flow path is exposed from inlet 231, through passage 232 to first cavity region 166, and through exhaust passage 182 to outlet 186.

It should be noted that like trigger ball 108 shown in FIGS. 1-3, trigger ball 256 acts as a check valve. In other words, since trigger ball 256 is too large to pass into second channel 254, it rests against shoulder 250 to prevent any gas communication between the passage through valve 150 and the second end 244 of thermal trigger 158.

Although the present invention has been described with reference to preferred embodiments, workers skilled in the art will recognize that changes may be made in form and detail without departing from the spirit and scope of the invention.

What is claimed is:

1. A thermally activated pressure relief valve for use with a high pressure compressed gas receptacle, comprising:
   a valve housing, for coupling to the receptacle, having a communication passage with an inlet for positioning within an interior of the receptacle and an outlet to an exterior of the housing, and a radial shoulder framing the passage;
   a seal plug, movable within the passage, with a first side exposed to the interior of the receptacle and sealed against the shoulder, and a second biased side; and
   thermal trigger means, threadably connected to the valve housing perpendicular to the seal plug and operably contacting the second biased side of the seal plug, for holding the first side of the seal plug against the shoulder while the thermal trigger means is below a predetermined temperature threshold, and for releasing the seal plug when the predetermined temperature threshold is reached to allow gas pressure to move the first side of the seal plug away from the shoulder to establish a flow path from the inlet through the passage to the outlet.

2. The valve of claim 1 wherein the thermal trigger means comprises:
   a trigger housing having an inner chamber with a first and second end;
   a thermally sensitive eutectic substance within the inner chamber of the trigger housing wherein the eutectic substance is in a solid state when its temperature is below the predetermined temperature threshold, and wherein the eutectic substance is in a liquid state when its temperature reaches the predetermined temperature threshold; and
   a detent, movable within the second end of the chamber, with a first area contacting the eutectic substance and a second area engaging the second biased side of the seal plug, the detent restraining the seal plug while the eutectic substance is below the predetermined temperature threshold so that the first side of the seal plug makes a fluid tight seal against the shoulder, and further moving within the second end of the chamber when the eutectic substance reaches the predetermined temperature threshold so as to disengage the second biased side of the seal plug and allow the plug to move within the passage.

3. The valve of claim 1 wherein the seal plug comprises:
   a cylindrical-shaped member having a hollow cavity opposite the first side and generally longitudinally aligned with the passage, the cavity open to a first end of the passage; and
   an exhaust port between the first side and the cavity and communicating with the cavity, the exhaust port further communicating with a second end of the passage.

4. The valve of claim 3 wherein the shoulder is at the second end of the passage and includes an o-ring between the shoulder and the first side for enhancing the fluid-tight seal.

5. The valve of claim 4 wherein the communication passage is configured such that movement of the first side of the seal plug away from the shoulder exposes the interior of the receptacle to the second end of the passage, allowing gas pressure to escape through the exhaust port and the cavity, and out the first end of the passage.

6. The valve of claim 2 wherein the thermal trigger means further comprises:
   check valve means for preventing gas pressure from escaping through the inner chamber of the thermal trigger after the first side of the seal plug moves away from the shoulder.

7. The valve of claim 1 wherein the seal plug comprises:
   a blocking poppet having:
   a cavity opposite the first side with a first cavity region and a second cavity region;
   a third side having a multiplicity of bores perpendicular to and communicating with the first cavity region; and
   a movable ball within each bore; and
   a restraining member having:
   a biased shoulder, opposite the second biased side, extending within the first cavity region and contacting the movable balls to exert a force on the balls in a first direction; and
   a pin emanating from the shoulder and extending within the second cavity region.

8. The valve of claim 7 wherein the balls extend in the first direction by the force of the biased shoulder, and engage a biased surface of the passage to fix the poppet securely within the passage and maintain the fluid tight seal between the first side and the shoulder.

9. The valve of claim 8 wherein the pin abuts a base of the second cavity region when the balls are extended to steady the restraining member.

10. The valve of claim 9 wherein the restraining member is movable within the cavity of the blocking poppet and wherein the biased shoulder disengages the balls when the detent disengages the second biased side of the restraining member.

11. The valve of claim 10 wherein the balls move in a second direction opposite the first direction and disengage the biased surface of the passage when the biased shoulder of the restraining member disengages the balls so as to allow the first side of the blocking poppet to move away from the shoulder by gas pressure and expose the passage to the interior of the receptacle.

12. The valve of claim wherein the passage includes a first segment having a first direction, and a second segment, connected to the first segment, having a second direction.

13. A thermally activated pressure relief valve for releasing pressure from a container when the relief valve reaches a predetermined temperature threshold, the relief valve comprising:
   a valve housing, for coupling to the receptacle, having a communication passage with an inlet for positioning within an interior of the receptacle and an outlet to an exterior of the housing;
   a movable member within the passage for interrupting a seal of the passage when the predetermined temperature threshold is reached; and
   a thermal trigger, threadably connected to the valve housing perpendicular to the movable member and operably coupled to the movable member for releasing the movable member, the thermal trigger comprising: a trigger housing having an inner chamber with a first and second end; a thermally sensitive eutectic substance within the inner chamber of the trigger housing wherein the eutectic substance is in a solid state when its temperature is below the predetermined temperature threshold, and wherein the eutectic substance is in a liquid state when its temperature reaches the predetermined temperature threshold; and a detent, movable within the passage, with a first area contacting the eutectic substance and a second area engaging a biased side of the movable member, the detent restraining the movable member while the eutectic substance is below the predetermined temperature threshold, and further moving within the second end of the chamber when the eutectic substance reaches the predetermined temperature threshold so as to disengage the biased side of the movable member and allow the movable member to move within the passage and interrupt the seal.

14. A thermally activated pressure relief valve for releasing pressure from a container when an ambient temperature adjacent to the relief valve reach a predetermined threshold, the relief valve comprising:
   a valve housing having a passage with an inlet for communicating with an interior of the container, and an outlet for communicating with an exterior of the valve housing;
   a seal, disposed within the passage between the inlet and the outlet, for sealing the passage;
   a movable member, disposed between the outlet and the seal, for interrupting the seal when the ambient temperature adjacent to the relief valve reaches the predetermined threshold; and
   a thermally responsive device threadably mounted to the valve housing perpendicular to the movable member so as to engage the movable member and restrain the movable member from interrupting the seal when the ambient temperature adjacent to the relief valve is below the predetermined temperature threshold, the thermally responsive device disengaging the movable member when the ambient temperature adjacent to the relief valve reaches the predetermined temperature threshold so as to allow the movable member to interrupt the seal and expose a flow path through the passage from the inlet to the outlet.

15. The thermally activated pressure relief valve of claim 13 wherein the thermally responsive device comprises:
   a thermally sensitive plug, having an open inner chamber exposed at a first and a second end of the thermally sensitive plug;
   a detent, movable within and extending partially outside the chamber at the second end of the thermally sensitive plug for engaging a surface of the movable member; and
   a thermally sensitive eutectic substance, within the inner chamber of the thermally sensitive plug, having a solid state below the predetermined temperature threshold and a mollified state at the predetermined temperature threshold, wherein the eutectic substance contacts a first region of the detent and fixes the detent within and partially extending from the inner chamber at the second end of the thermally sensitive plug when the eutectic substance is in the solid state, and wherein the eutectic substance allows the detent to migrate within the inner chamber toward the first end of the thermally sensitive plug when the eutectic substance is in the mollified state so as to disengage the surface of the movable member.

16. The thermally activated pressure relief valve of claim 14 wherein the seal includes a sealing surface abutting an O-ring.

17. A thermally activated pressure relief valve for use with a high pressure compressed gas receptacle, comprising:
   a valve housing, for coupling to the receptacle, having a communication passage with an inlet for positioning within an interior of the receptacle and an outlet to an exterior of the housing, and a radial shoulder framing the passage;
   a seal plug, movable within the passage, with a first side exposed to the interior of the receptacle and sealed against the shoulder, and a second biased side, the seal plug comprising:
      a cylindrical-shaped member having a hollow cavity opposite the first side and generally longitudinally aligned with the passage, the cavity open to a first end of the passage; and
      an exhaust port between the first side and the cavity and communicating with the cavity, the exhaust port further communicating with a second end of the passage; and
   thermal trigger means, operably contacting the second biased side of the seal plug, for holding the first side of the seal plug against the shoulder while the thermal trigger means is below a predetermined temperature threshold, and for releasing the seal plug when the predetermined temperature threshold is reached to allow gas pressure to move the first side of the seal plug away from the shoulder to establish a flow path from the inlet through the passage to the outlet.

18. The valve of claim 17 wherein the shoulder is at the second end of the passage and includes an o-ring between the shoulder and the first side for enhancing the fluid-tight seal.

19. The valve of claim 18 wherein the communication passage is configured such that movement of the first side of the seal plug away from the shoulder exposes the interior of the receptacle to the second end of the passage, allowing gas pressure to escape through the exhaust port and the cavity, and out the first end of the passage.

20. The valve of claim 17 wherein the thermal trigger means comprises:
   a trigger housing having an inner chamber with a first and second end;
   a thermally sensitive eutectic substance within the inner chamber of the trigger housing wherein the eutectic substance is in a solid state when its temperature is below the predetermined temperature threshold, and wherein the eutectic substance is in a liquid state when its temperature reaches the predetermined temperature threshold; and
   a detent, movable within the second end of the chamber, with a first area contacting the eutectic substance and a second area engaging the second biases side of the seal plug, the detent restraining the seal plug while the eutectic substance is below the predetermined temperature threshold so that the first side of the seal plug makes a fluid tight seal against the shoulder, and further moving within the second end of the chamber when the eutectic substance reaches the predetermined temperature threshold so as to disengage the second biased side of the seal plug and allow the plug to move within the passage.

21. The valve of claim 20 wherein the thermal trigger means further comprises:
   check valve means for preventing gas pressure from escaping through the inner chamber of the thermal trigger after the first side of the seal plug moves away from the shoulder.

22. A thermally activated pressure relief valve for use with a high pressure compressed gas receptacle, comprising:
   a valve housing, for coupling to the receptacle, having a communication passage with an inlet for positioning within an interior of the receptacle and an outlet to an exterior of the housing, and a radial shoulder framing the passage;
   a seal plug, movable within the passage, with a first side exposed to the interior of the receptacle and sealed against the shoulder, and a second biased side, the seal plug comprising:
      a blocking poppet having a cavity opposite the first side with a first cavity region and a second cavity region; a third side having a multiplicity of bores perpendicular to and communicating with the first cavity region; and a movable ball within the each bore; and
      a restraining member having a biased shoulder, opposite the second biased side, extending within the first cavity region and contacting the movable balls to exert a force on the balls in a first direction; and a pin emanating from the shoulder and extending within the second cavity region; and
   thermal trigger means, operably contacting the second biased side of the seal plug, for holding the first side of the seal plug against the shoulder while the thermal trigger means is below a predetermined temperature threshold, and for releasing the seal plug when the predetermined temperature threshold is reached to allow gas pressure to move the first side of the seal plug away from the should to establish a flow path from the inlet through the passage to the outlet.

23. The valve of claim 22 wherein the balls extend in the first direction by the force of the biased shoulder, and engage a biased surface of the passage to fix the poppet securely within the passage and maintain the fluid tight seal between the first side and the shoulder.

24. The valve of claim 23 wherein the pin abuts a base of the second cavity region when the balls are extended to steady the restraining member.

25. The valve of claim 24 wherein the restraining member is movable within the cavity of the blocking poppet and wherein the biased shoulder disengages the balls when the detent disengages the second biased side of the restraining member.

26. The valve of claim 25 wherein the balls move in a second direction opposite the first direction and disengage the biased surface of the passage when the biased shoulder of the restraining member disengages the balls so as to allow the first side of the blocking poppet to move away from the shoulder by gas pressure and expose the passage to the interior of the receptacle.

27. The valve of claim 26 wherein the passage includes a first segment having a first direction, and a second segment, connected to the first segment, having a second direction.

* * * * *

UNITED STATES PATENT AND TRADEMARK OFFICE
CERTIFICATE OF CORRECTION

PATENT NO. : 5,197,671

DATED : March 30, 1993

INVENTOR(S) : LLOYD G. WASS, MICHAEL R. BAIRD

It is certified that error appears in the above-identified patent and that said Letters Patent is hereby corrected as shown below:

Col. 12, line 42, delete "should", insert --shoulder--

Signed and Sealed this

Thirtieth Day of November, 1993

Attest:

BRUCE LEHMAN

Attesting Officer

Commissioner of Patents and Trademarks